W. T. Sawyer,
Wheel Hub
No. 70027.          Patented Oct. 22, 1867.
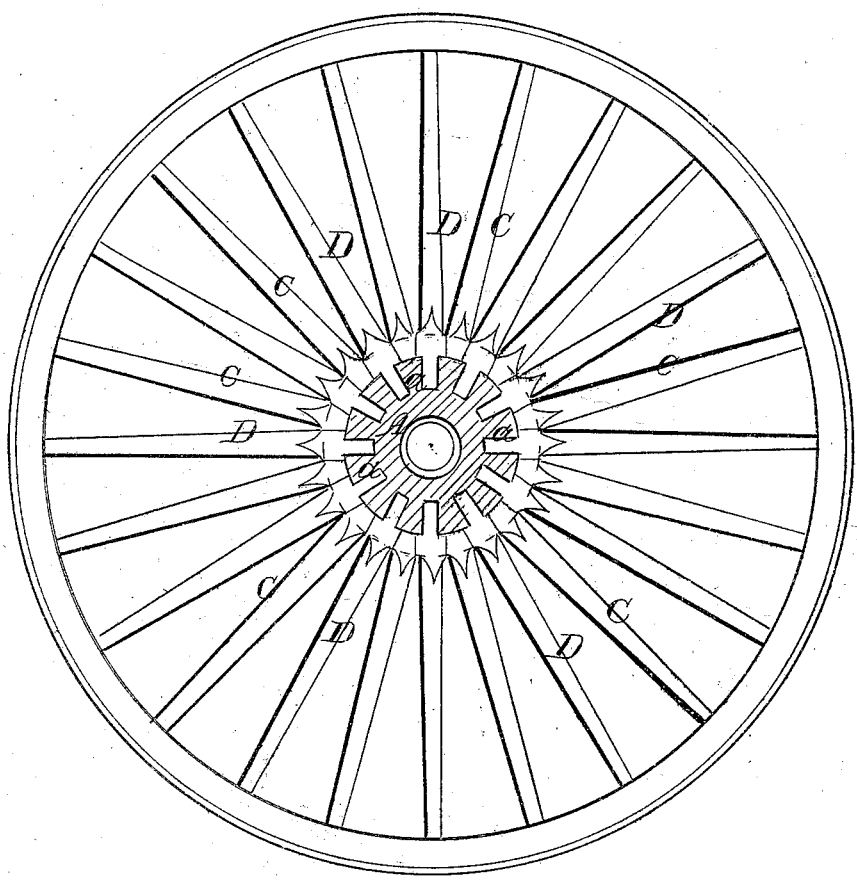
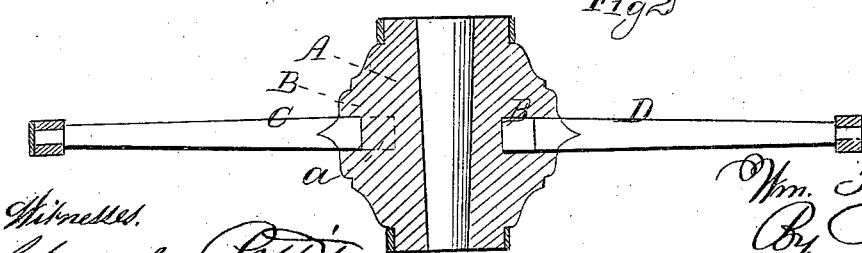

UNITED STATES PATENT OFFICE.

WILLIAM T. SAWYER, OF MOBILE, ALABAMA.

IMPROVEMENT IN WHEELS FOR VEHICLES.

Specification forming part of Letters Patent No. 70,027, dated October 22, 1867.

*To all whom it may concern:*

Be it known that I, WILLIAM T. SAWYER, of Mobile, in the county of Mobile and State of Alabama, have invented a new and useful Improvement in Wheels for Vehicles; and I do hereby declare the following to be a full, clear, and exact description of the same, reference being had to the accompanying drawings, which are made part of this specification, and in which—

Figure 1 is a sectional view of a wheel embodying my invention, the plane of section being at right angles to the axis. Fig. 2 is a section of the same in a plane parallel with the axis.

Similar letters of reference indicate corresponding parts in the two figures.

In connection with the spokes, which are secured to the hub by mortise and tenon, in customary manner, I employ supplemental or supporting spokes, which have their inner ends confined within a circumferential groove on the hub, and between the tenoned spokes, in such a manner as to greatly add to the strength of the wheel without weakening the hub by additional mortises, as will be hereinafter fully explained.

In order that others skilled in the art to which my invention appertains may be enabled to fully understand and use the same, I will proceed to describe it in detail.

The hub A has turned or otherwise formed in its circumference a groove, B, of proper depth to confine the inner ends of the supplemental spokes C.

The mortises a, for the reception of the tenons of the ordinary spokes D, are formed in the bottom of the groove B, as represented.

Between the inner ends of the tenoned spokes D are fitted the inner ends of the supplemental spokes C, which, being confined in the groove B, are held tightly and snugly in position, as shown in Fig. 1.

Instead of cutting or turning a groove in the hub A to receive the ends of the supplemental spokes C, I propose to employ two strong, thick bands of iron or other metal, which, being shrunk upon the hub at the opposite sides of the circle of mortises, and fastened by screws or otherwise, will form an equivalent means or groove in which to confine the ends of the supplemental spokes.

By means of these bands the ordinary wheels, or wheels already in use, may be the more readily adapted for the introduction of the supplemental spokes.

By the above construction a wheel may be strengthened by an increased number of spokes, without diminishing the strength of the hub by a correspondingly-increased number of mortises.

The hub, spokes, and felly may be made of wood, iron, steel, or other suitable metal.

Having thus described my invention, what I claim as new herein, and desire to secure by Letters Patent, is—

A wheel provided with spokes D and supplemental spokes C, having their inner ends confined upon the hub by means of a groove or its equivalent, substantially as and for the purpose set forth.

WM. T. SAWYER.

Witnesses:
    J. T. WALSHE,
    REUBEN NASON.